Feb. 15, 1966 V. H. JENSEN 3,234,906
METHOD OF MILKING AND A SPECIFIC TEAT CUP LINER
Filed July 27, 1962
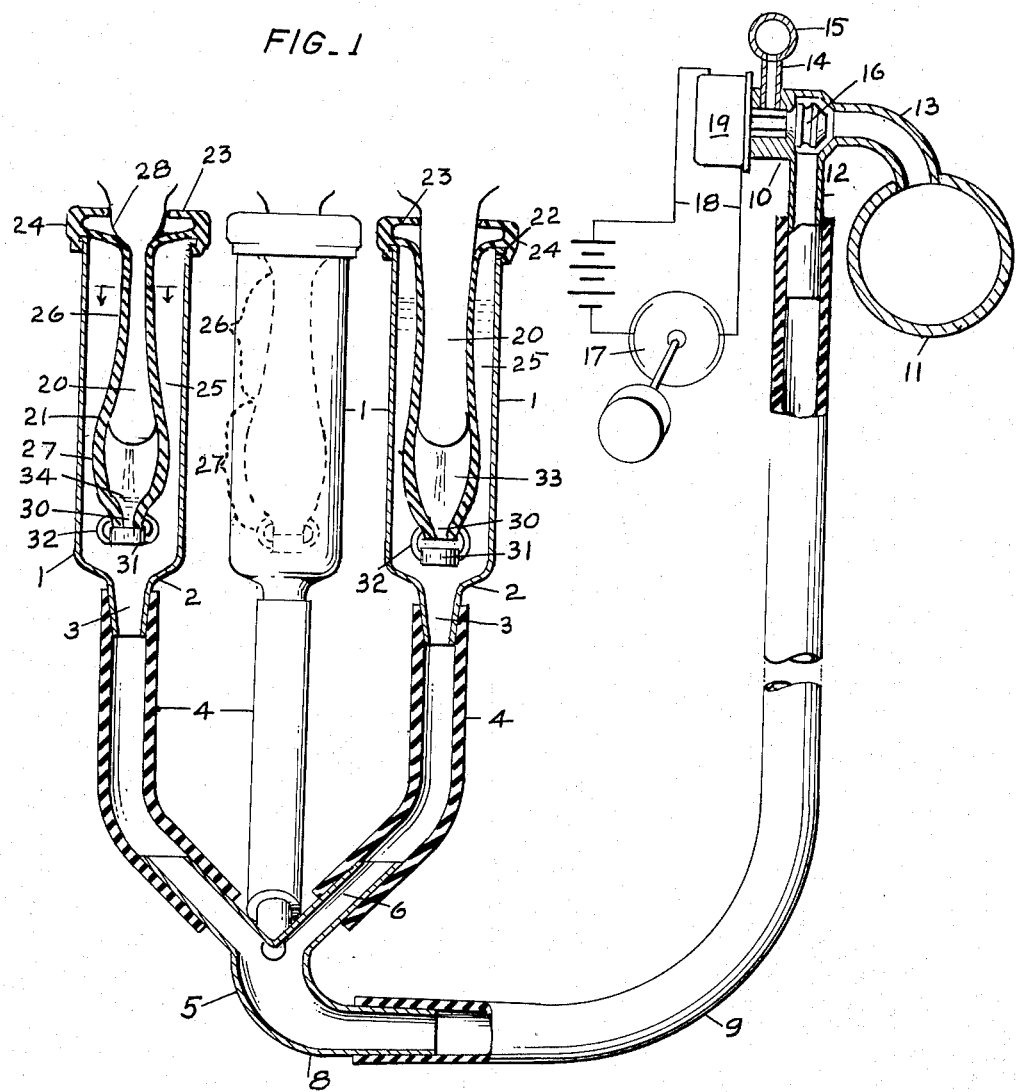
FIG_1
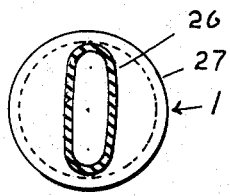
FIG_2
INVENTOR.
VILLY H. JENSEN
BY
Boykin, Mohler & Foster
ATTORNEYS United States Patent Office 3,234,906
Patented Feb. 15, 1966

3,234,906
METHOD OF MILKING AND A SPECIFIC
TEAT CUP LINER
Villy Haagen Jensen, P.O. Box 823, Sausalito, Calif.
Filed July 27, 1962, Ser. No. 212,839
9 Claims. (Cl. 119—14.02)

This is a continuation in part of copending application, Serial No. 105,769, filed April 26, 1961, now abandoned and has for one of its objects the provision of a milking apparatus that includes an arrangement whereby the teats of the cow being milked are alternately subjected to vacuum and to pressure in a manner that closely simulates the action of a feeding calf, and that results in a fast milking operation without injury to the teats.

Another object of the invention is the provision of a method of milking a cow in which the milk drawn from the udder is reciprocated within an enclosed path of travel to effect alternate vacuum and pressure at the teats, providing a complete rest period or release from the effect of suction, between applications of the latter to the teats.

A still further object of the invention is the provision of apparatus for milking that includes the intermittent application of a partial vacuum to the teats and teat liners for intermittently withdrawing the milk from the teats, and which liners are so constructed as to strip the milk from the teats by a physical action between the periods when the vacuum is applied.

An added object of the invention is the provision of flexible, rubber or rubber-like teat liners that are generally oval or flattened in cross sectional contour at the teat engaging portion of each, so as to yieldably compress the teat at two opposite sides when there is no vacuum at the teat cups and liners for withdrawing the milk by suction, but which liners expand so as to permit free withdrawal of the milk when vacuum is applied, after which the liners will again yieldably compress the teats to strip the milk from the teats, the compressive action being due to the liners resuming their natural generally oval cross sectional contours as soon as they are exteriorly free from the influence of the partial vacuum.

Another object of the present invention is the provision of structure in the teat liners and cups, and the manner of applying suction and pressure thereto, whereby the lower ends of the teats will be alternately subjected to the influence of vacuum and gentle air pressure, thereby preventing the development of soreness in the teats due to the unrelieved application of vacuum to the teats, which latter occurrence is common in the dairy industry.

An added object of the invention is a structure and combination of structural features including a mode of operation, in milking apparatus, whereby the lower ends of the teats are exposed within the liners in the teat cups so as not to be contacted by the liner. This is important in the prevention of the transmission of infection from one cow to the other.

Also an object of the invention is the provision of milking apparatus that is simple and economical to make and which apparatus may be readily cleaned, being free from complicated structure.

Other objects and advantages will appear in the description and in the drawings.

In the drawings:

FIG. 1 is a part sectional part elevational view of a substantially complete system, certain parts being shematically illustrated, and in cross section, and two of the four teat cups and liners being illustrated in cross section. For purposes of explanation only, one of the two teat liners shown in section is illustrated in its condition during the suction stroke while the other is illustrated in its condition during the pressure stroke. Actually all four teat liners operate simultaneously during the suction and pressure strokes in the same manner.

FIG. 2 is an enlarged cross sectional view taken along line 2—2 of FIG. 1.

Referring to FIG. 1, the teat cups are each generally designated 1, each being an elongated, cylindrical member, usually of stainless steel, that is fully open at one end, but that is formed with a head 2 at the opposite end. This head 2 is provided with a nipple 3 that, in turn, is adapted to be connected with one of the ends of a flexible tube 4.

Each milking assembly has four identical teat cups, and each of these is connected with one end of a tube 4, and all four tubes connect at their opposite ends with a fitting 5 having a nipple 6 with each tube and with which each is connected. This fitting 5, in turn, is provided with an elbow 8 that connects with one end of a flexible pipe 9. The other end of this pipe 9 connects with a conventional pulsator, generally designated 10, that, in turn, is connected with a constant suction pipe line 11 that conducts the milk to receptacle therefor at a remote point.

For purpose of description, the pulsator may include a chamber 12 that is connected by a pipe or tube 13 with the continuous suction line 11. An air line or pipe 14 also opens into the chamber 12 and this line may either communicate with the atmosphere directly, or with a pipe 15. Pipe 15 may, in turn, communicate with the atmosphere at a point outside the barn, or it may be a fluid pressure line, in certain installations. When used as a fluid pressure line it may carry air under a constant pressure during milking hours and may be used to carry water for cleaning the system after the milking is concluded.

A solenoid actuated valve member 16 is adapted to alternately open and close pipe connection 13 (which is connected with the constant suction) and pipe 14 (which is in communication with the atmosphere). Thus air, which is at least at atmospheric pressure, is placed in communication with chamber 12 and pipe 9 when the valve member 16 closes the chamber 12 and pipe 9 to the influence of vacuum in line 11, and when the valve member 16 closes the line 14 (air line) the suction line 11 will be in communication with chamber 12 and pipe 9.

Any suitable conventional motor driven the timer switch 17 in an electrical circuit 18 may be used for actuating the sloneoid 19 associated with valve member 16 for actuating the latter at the desired time intervals, said solenoid including the usual spring for actuating the valve member when the circuit 18 is broken by the operation of the timer switch 17.

In conventional pulsator actuated milkers, the pulsator merely functions to cause pulsations in the vacuum line that communicates with the teat cups, but the teat liners are continuously under the influence of vacuum. The intervals between closing of the vacuum line 11 in the present instance may be approximately the same as in the conventional pulsator system, but in the present instance, as is readily apparent, when the connection between pipe 9 that leads to the teat cups and vacuum line 11 is broken, the line 9 is open to atmospheric pressure, at least, or positive air pressure above atmospheric air pressure may be provided if the air in pipe line 15 carries air at the higher pressure. This will be explained later more in detail.

Referring to the teat cups, the left hand teat cup and liner, as seen in the drawing, and as already explained in the brief description of the drawing, shows the liner in more or less collapsed position. In the drawing, a teat 20 is indicated as being in position within a teat cup liner 21, in a collapsed position, and this collapsed position is the one in which the teat cup liner is actually formed. Hence it will automatically resume this position under the force of the natural resiliency of the rubber of the liner.

It is to be understood that the word "rubber" is intended to refer to any material having the elastic characteristic of rubber, and is not intended to be restricted to rubber.

The teat cups 1 as has been stated are cylindrical, and each is formed with a radially outwardly projecting flange 22 around the open end thereof opposite to head 2.

As seen in FIG. 1, the upper end of each liner 21 has a centrally apertured annular head 23 that is formed with an axially extending flange 24 adapted to extend over the flange 22 on the teat cup for holding the liner onto the cup, although the flange 24, being stretchable, will stretch over flange 22 for yieldably securing the liner to the teat cup, with the liner depending into the cup, spaced from the sides of the latter to provide a space or chamber 25 between the walls of the teat cup and the liner. The lower end of the liner is also spaced above the head 2 at the lower end of each teat cup.

The upper end portion 28 of the liner 21 is annular and integrally connects with the flange 24, said upper end portion extending radially relative to the axis of the teat cup over the upper edge of the latter.

Close to said upper annular end portion of the liner 21, the cross sectional contour of the latter becomes flattened or of oval shape, but a relatively flat oval, as seen in FIG. 2, and this oval cross sectional contour continues downwardly and becomes progressively more open until it becomes cylindrical at the lower end portion.

The intermediate section of the liner is designated 26 while the lower cylindrical end section is designated 27. The walls of the intermediate section 26 are preferably thinner than the walls of the lower end section 27 and said walls may become progressively thicker in a downward direction. Thus the walls of section 26 will respond to change in cross sectional contour upon change in the air pressure in chamber 25 relative to pressure within the liner.

The length of the intermediate section 26 is preferably approximately equal to the average length of teat 20, thus the lower end of a teat within the liner will be at a point where the liner is cylindrical and it will not be compressed by the flattened intermediate portion, although it should be noted that the liner is flattened to its maximum degree adjacent to the upper end of the intermediate section 26. The lower cylindrical section, and the intermediate section may be of approximately the same length.

The lower end of the lower section 27 is provided with a downwardly directed outlet 30 that is closed by a rubber valve member 31, the latter being yieldably held in closed position by a pair of flexible arcuate rubber connectors 32 that may be formed integral with the member 31 and the liner. Thus valve member 31 may be termed a check valve, since it will close the outlet 30 against a return flow of milk into the liner, while permitting milk to be withdrawn through the outlet.

It should be noted that the head 23 on the liner 21 does not cause a restriction on the teat but normally merely provides a surface that may engage the udder. If the teat were restricted by the head 23 it would prevent release of the milk.

In explanation of the manner of operation, the "suction stroke" will refer to the interval of time when the valve member 16 opens the suction line 11 to the pipe 9, and air pressure is shut off, while the "pressure stroke" will refer to the interval of time when air pressure through pipe 14 is in communication with the pipe 9 and communication between suction line 11 and pipe 9 is closed.

The valve member 16, in FIG. 1, is shown in open position and in this position the pipe 9 is connected with suction line 11 and a vacuum condition exists in the chamber 25 or space between the valve cup 1 and the liner 21. When this occurs the pressure within the intermediate flattened section 26 of the liner 21 is greater than the air pressure in chamber 25, and the section 26 will round out and valve member 31 will be drawn open, thereby applying suction to the teat 20 and the withdrawal of milk. The sides of the teat 20 are, of course, in sealing relation to the inner sides of the intermediate section 26 and the space or chamber 33 within the lower section 27 below teat 20 is always open.

Upon opening of valve member 30 the milk will be drawn from the teat directly out of chamber 33 and into tube 4 and pipe 9.

It is to be understood that on the suction stroke, the operation of all four liners 21 is the same and simultaneous.

The right hand teat cup in FIG. 1 shows the teat cup liner 21 in expanded position with valve member 31 open. Upon the pressure stroke the valve member 31 will close, as seen in the left hand teat cup liner in FIG. 1. When this occurs a partial vacuum remains in chamber 33 or in the space between the valve 31 and the teat 20, and atmospheric pressure is in the chamber 25 around the liner 21, hence the section 26 of the liner will move to collapsed position progressively compressing the teat from the upper end of section 26 of the liner downwardly, thereby stripping milk 34 in the teat into the lower portion of chamber 33, with the result of establishing a positive air pressure within chamber 33 and applying such air pressure against the lower end of each teat, to replace the vacuum. This application of air pressure occurs alternately with the application of vacuum, hence will establish what may be called a "rest" period that will counteract the effect of the vacuum, the application of a constant vacuum not being a natural condition, leads to soreness.

The suction line 11 through which milk is conducted away from the cow is normally in an elevated position relative to the cow, and upon alternate pressure and suction strokes, the milk will rise in the pipe 9 and tubes 4, and will be reciprocated to function as a liquid plunger, except that with each suction stroke an amount of milk equal to that drawn from the udder will be drawn away through the line 11.

Upon each suction stroke, when sufficient milk is in the pipe 9 to form a liquid piston, the column of milk in pipe 11 will be drawn upwardly in pipe 9 and upon the pressure stroke, when valve member 16 closes the suction line 13 and air is admitted to the upper end of milk column through pipe 14, the column of milk will fall, and the lower the level of the milk in cup 1 and tubes 4, the greater will be the kinetic energy transferred to the air in chamber 25 and the liner will be compressed and some air will be discharged past the collar or flange 24 to the atmosphere.

One of the features of this invention is the constructing of the flange 24 of the desired elasticity and thickness so that air will escape past the flange, until a momentary equilibrium is reached in which the air in the upper portion of the space 25 will be compressed by the milk on the pressure stroke to absorb the kinetic energy of the column of milk less the losses due to friction, expansion of the hose 9, tubes 4, compression of the liner etc. In actual practice the relief valve which, it is seen, is the flange 24 and the upper end of the teat cup, will cease to function as an air relief valve when the milk is at a level within the upper portion of space 25, or generally at the level 35 indicated in the space 25 of the right hand teat cup in FIG. 1. The degree to which the column of milk will rise in hose 9 when the level 35 in the teat cup is reached is relatively short as compared with the level of the milk at an earlier stage, hence the degree of reciprocation of the milk column is relatively slight, and no further air will be exhausted from space 25, but the level will stay the same until the milking operation is finished. Were the milk to fill the milk cup there would be no reciprocation of the milk and no milking operation.

It is obvious that a conventional relief valve could be installed in the teat cup adjacent to the upper end thereof, but I have found that by a relatively careful control of the rubber in the flange 24 it can be designed to permit the discharge of air therepast, and to thereby permit the use of the level of the milk in the teat cup to substantially enclose the teat so that pressure will be transmitted to the teat through the milk. This provides a structure that is economical to make, reliable, and easy to clean, which features are not found so readily in spring loaded relief valves.

If positive air pressure were introduced through line 15 upon each pressure stroke about the only difference in result would be a faster drop of the column of milk. In this case, such pressure would naturally have to be determined and the flange 24 is stiffened to prevent escape of air in space 25 to a point and thereafter, and while air is in the upper portion of chamber 25 close the space to further ejection of air, so that a proper reciprocation of milk can be accomplished. In any event, however, at least atmospheric pressure must be placed in communication with line 9 between each suction stroke.

The stripping of the teats by the progressive, mechanical contraction of the sections 26 of each liner will insure a complete milking of a cow, and is one of the features of this invention.

The method, as conceived independent of apparatus, comprises the steps of intermittently moving a column of milk in an enclosed path of travel closed at one end thereof by the teats of the cow being milked in directions toward and away from said teats and ejecting from said column at each movement thereof away from said teats a predetermined amount of said milk whereby said teats will be subjected to a partial vacuum upon said last mentioned movement to withdraw milk from said teats to said column, maintaining an air space between said column and the lower ends of said teats free from the influence of said column upon movement of said column toward said teats and through which milk withdrawn from said teats passes to said column.

It is to be understood, of course, that the invention as described and illustrated herein is not to be taken as restrictive, since modifications that would occur to one skilled in the art are intended to come within the spirit and scope of the invention.

I claim:

1. The method of milking a cow that comprises the steps of:
   (a) supporting a column of milk that has been withdrawn from a cow, within an enclosed path of travel that is closed at one end by the teats of said cow;
   (b) intermittently moving said column in said path toward and away from said teats whereby an intermittent partial vacuum is established at said teats during movement of said column away from said teats to withdraw a quantity of milk from said teats into said column when such partial vacuum is established;
   (c) discharging from said column an amount substantially equal to said quantity upon each movement of said column away from said teats;
   (d) transmitting energy from each movement of said column toward said teats to the lateral sides of the latter to compress the latter for ejecting the milk that is within said teats.

2. The method as defined in claim 1 that includes the steps of:
   (e) maintaining an air space between the lower ends of said teats and said column at all times during said intermittent movement of said column through which space the milk drawn from said teats and ejected therefrom passes to said column.

3. The method as defined in claim 1 that includes the steps of:
   (e) applying a pressure to the air within said space alternately of the partial vacuum that is created therein during the movement of said column away from said teats.

4. The method as defined in claim 3 in which:
   (a) said air pressure being produced by the milk ejected into said space by said compression of said teats.

5. In milking apparatus:
   (a) a vertically elongated, cylindrical, teat cup of relatively rigid material open at its upper end and having a head at its lower end provided with an outlet for milk;
   (b) a vertically elongated, tubular liner within said cup having an open upper end adapted to receive the teat of a cow therein, with the upper end of said liner adjacent to the udder and the lower end spaced from the lower end of said teat;
   (c) means on the upper end of said liner removably securing said upper end thereof to the upper end of said cup and supporting said liner within the latter spaced from the sides and lower end of said cup;
   (d) the upper section of said liner being of flexible, resilient rubber-like material having two of its opposed sidewalls generally flattened and relatively close together when said liner is in a collapsed position to yieldably compress opposite sides of the upper portion of the teat adapted to be received within said liner and said upper section being adapted to expand to an expanded position of generally cylindrical cross sectional contour having its inner surface in sealing relation to such teat upon application of a partial vacuum within the space between the walls of said cup and said liner and the lower end of said liner being formed with a discharge opening;
   (e) a check valve at said discharge opening for closing the latter against flow of fluid into said liner from the space between said liner and the walls of said cup;
   (f) a conduit for milk extending from said outlet to a level above that of said outlet connecting the space between the walls of said cup and said liner with a source of vacuum;
   (g) valve means in said conduit at a level above the level of said outlet for intermittently closing and opening said conduit to said source and for opening said conduit to air at atmospheric pressure upon closing said conduit to said source and for closing said conduit to said air upon opening said conduit to said source whereby a column of milk drawn into said conduit will intermittently be reciprocated therein and moved in said conduit past said valve means.

6. In milking apparatus as defined in claim 5:
   (h) the lower end portion of said liner being substantially cylindrical and relatively rigid as compared with said upper portion to resist collapse and expansion thereof.

7. In milking apparatus:
   (a) a vertically elongated, cylindrical, teat cup of relatively rigid material open at its upper end and having a head at its lower end provided with an outlet;
   (b) a vertically elongated tubular liner within said cup having an open upper end adapted to receive the teat of a cow therein, with the upper end of said liner adjacent to the udder and the lower end spaced from the lower end of said teat and a discharge opening forward formed in the lower end of said liner;
   (c) means on the upper end of said liner removably securing said upper end thereof to the upper end of said cup and supporting said liner within the latter spaced from the sides and lower end of said cup and closing the space between the upper open ends of said cup and liner;

(d) the upper section of said liner being of flexible, resilient rubber-like material having two of its opposed sidewalls generally flattened and relatively close together when said liner is in a collapsed position to yieldably compress opposite sides of the upper portion of the teat adapted to be received within said liner and said upper section being adapted to expand to an expanded position of generally cylindrical cross sectional contour having its inner surface in sealing relation to such teat upon application of a partial vacuum within the space between the walls of said cup and said liner;

(e) a check valve at said discharge opening for closing the latter against flow of fluid into said liner from the space between said liner and the walls of said cup;

(f) a conduit extending from said outlet for connecting the space between the walls of said cup and said liner with a source of vacuum and a source of vacuum connected with said conduit;

(g) an air inlet in constant communication with air at not less than atmospheric pressure opening into said conduit at a point between said source of vacuum and said outlet;

(h) valve means in said conduit movable for intermittently closing said conduit to communication between said source of vacuum and said outlet and at the same time for opening said inlet, alternately with substantially simultaneously opening said conduit to communication between said source of vacuum and said outlet and closing said inlet, and means for so moving said valve means;

(i) the wall of said cup being fully closed to ingress and egress of fluid except at its open upper end and at said outlet, and the portion of said conduit between said valve means, and said outlet being of generally U-shaped for holding a body of milk drawn from said cup during a milking operation to be oscillated therein longitudinally of said conduit during said movement of said valve means and to close said cup to direct contact with air from said inlet when said portion of said conduit at the lower end of the bend thereof is filled with milk.

8. In milking apparatus of the type that includes a relatively rigid, vertically elongated, tubular teat cup that is open at its upper end and provided with an outlet for milk at its lower end for connection with a source of vacuum, a liner comprising:

(a) a unitary, vertically elongated, tubular, cylindrical member for said cut having sidewalls, a lower end wall and an open upper end for insertion of a teat of a cow therein, the inside length of said member being longer than the teat to be inserted therein when the upper end of said member is adjacent to the udder with substantially the entire teat enclosed within said member whereby a chamber for air will be between the lower end of such teat and the lower end of said member and the horizontal width of said member being substantially less than the inside diameter of the cup within which said member is to be suspended;

(b) supporting means integral with said sidewalls around the upper open end thereof extending generally radially outwardly thereof for releasably securing said member to the upper end of said teat cup and for suspending said member within said cup spaced from the sidewalls thereof, and for closing the space between said cup and said member at their upper ends;

(c) the upper portion of said sidewalls adjacent to and below said supporting means being of flexible, elastic, relatively thin material and of flattened, generally elliptical shape in horizontal cross-sectional contour to provide a major axis of a length approximately the thickness of said teat for sealing contact with the sides of the latter and a minor axis of a length substantially less than said thickness whereby two opposite sides of said teat will be compressed under the inherent resiliency of the sidewalls at a point adjacent to said udder when said teat is within said member;

(d) the lower portion of said member adjacent to said lower end wall being cylindrical and having an inside diameter approximately equal to that of said teat;

(e) the thickness of the material of said liner at said point where it is adapted to compress said teat adjacent to the udder and its resiliency being such that it will expand under the influence of a partial vacuum around said member from said elliptical cross-sectional contour to substantially cylindrical contour and will return to said elliptical cross-sectional contour under the inherent resiliency of said material upon release of said partial vacuum, and the lower cylindrical portion of said member being relatively rigid and resistant to distortion under variations in external and internal pressure thereagainst above and below atmospheric pressure, said sidewalls being progressively more cylindrical in horizontal cross-sectional contour in a direction from said point to said lower end portion whereby the two opposite sidewalls that are flattened will extend divergently relative to each other in a downward direction;

(f) said lower end wall of said member being formed with an outlet and a normally closed check valve for said outlet adapted to open only under the influence of external suction for withdrawing milk from within said member and from a teat within the latter.

9. In milking apparatus that includes a relatively rigid, vertically elongated, tubular teat cup that is open at its upper end and closed at its lower end and provided with an outlet for milk and for connections with a source of alternate vacuum and above atmospheric pressure for alternately creating a partial vacuum and above atmospheric pressure within said cup:

(a) a vertically elongated, tubular liner having sidewalls and a lower end wall and an open upper end for insertion of a teat of a cow therein;

(b) liner supporting means integral with said sidewalls around said upper open end thereof for releasably securing said liner to the upper end of said cup, and for suspending said liner within the latter spaced from the sides and lower end of said cup, and for closing the space between said liner and cup at their upper ends;

(c) said sidewalls of said liner adjacent to and below said liner supporting means being of flexible, elastic, relatively thin material flattened in horizontal cross-sectional contour in one horizontal dimension with the walls so flattened spaced apart a distance to yieldably compress the teat within said liner at a point adjacent to the udder upon above atmospheric air pressure within said liner being applied to the lower end of said teat, and said liner being of substantially greater length than the teat to be inserted therein to provide a space between said lower end of said liner and the lower end of such teat;

(d) the thickness of said liner and its resiliency at and adjacent to said point being such that it will readily expand upon application of a partial vacuum in the space between said cup and liner, and the walls of said liner at the lower end thereof around and below the lower end of such teat when the latter is within said liner being rigid against collapse and distortion under the influence of partial vacuum and pressure within the space between said liner and cup;

(e) an outlet in said lower end of said liner and a check valve therein adapted to open only under the influence of a partial vacuum within the space between said liner and said cup and to close under the influence of above atmospheric pressure in said space.

References Cited by the Examiner

UNITED STATES PATENTS

| | | | |
|---|---|---|---|
| 971,537 | 10/1910 | Hulbert | 119—14.31 X |
| 1,089,932 | 3/1914 | Lubke | 119—14.38 |
| 1,238,831 | 9/1917 | Sharples | 119—14.27 X |
| 1,260,466 | 3/1918 | Sharples | 119—14.53 |
| 1,261,780 | 4/1918 | Dinesen | 119—14.36 X |
| 1,398,368 | 11/1921 | Endorf | 110—14.32 X |
| 1,471,394 | 10/1923 | Frimand | 119—14.02 |
| 1,641,316 | 9/1927 | Bruun | 119—14.47 X |
| 2,169,992 | 8/1939 | Shurts | 119—14.44 X |
| 2,282,159 | 5/1942 | Berndt | 119—14.51 |
| 2,516,354 | 7/1950 | Taylor | 119—14.44 X |
| 2,621,626 | 12/1952 | Harris et al. | 119—14.52 |
| 2,675,821 | 4/1954 | Conde | 137—103 |

ABRAHAM G. STONE, *Primary Examiner.*

ALDRICH F. MEDBERY, ARNOLD RUEGG, ANTONIO F. GUIDA, *Examiners.*